United States Patent
Sugawara

(10) Patent No.: US 6,751,020 B2
(45) Date of Patent: Jun. 15, 2004

(54) STEREOSCOPIC IMAGE PICKUP SYSTEM

(75) Inventor: Saburo Sugawara, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/771,982

(22) Filed: Jan. 30, 2001

(65) Prior Publication Data

US 2001/0015847 A1 Aug. 23, 2001

(30) Foreign Application Priority Data

Feb. 2, 2000 (JP) .......................... 2000-025573

(51) Int. Cl.⁷ .................. G02B 27/22; H04N 13/00; A61B 1/04; G03B 35/00
(52) U.S. Cl. .................. 359/462; 359/464; 600/111; 396/324; 348/42
(58) Field of Search ................. 359/462, 464, 359/466; 348/42, 43, 46, 47, 48, 49, 50, 51, 56; 600/111; 396/324

(56) References Cited

U.S. PATENT DOCUMENTS

| | | | | |
|---|---|---|---|---|
| 3,251,933 A | * | 5/1966 | Beste | 359/462 |
| 4,824,228 A | * | 4/1989 | Wickholm et al. | 359/462 |
| 5,134,524 A | | 7/1992 | Hamano et al. | 359/387 |
| 5,247,393 A | | 9/1993 | Sugawara | |
| 5,257,134 A | | 10/1993 | Sugawara | 359/679 |
| 5,303,088 A | | 4/1994 | Sugawara | 359/753 |
| 5,341,243 A | | 8/1994 | Okuyama et al. | |
| 5,550,679 A | | 8/1996 | Sugawara | |
| 5,552,938 A | | 9/1996 | Sugawara | |
| 5,600,490 A | | 2/1997 | Sugawara et al. | 359/690 |
| 5,661,597 A | | 8/1997 | Sugawara | |
| 5,668,595 A | * | 9/1997 | Katayama et al. | 348/47 |
| 5,684,635 A | | 11/1997 | Sugawara | |
| 5,701,475 A | | 12/1997 | Sugawara | |
| 5,737,113 A | | 4/1998 | Kuramochi et al. | |
| 5,757,553 A | | 5/1998 | Sugawara | |
| 5,781,349 A | | 7/1998 | Sugawara | |
| 5,835,133 A | | 11/1998 | Moreto et al. | |
| 5,886,816 A | | 3/1999 | Faris | 359/464 |
| 5,920,433 A | | 7/1999 | Sugawara | |
| 5,926,316 A | | 7/1999 | Sugawara | |
| 5,969,873 A | | 10/1999 | Sugawara | |
| 5,969,875 A | | 10/1999 | Sugawara | |
| 5,973,847 A | | 10/1999 | Sugawara | |
| 5,976,071 A | * | 11/1999 | Sekiya | 600/111 |
| 5,986,806 A | | 11/1999 | Sugawara | |
| 5,989,185 A | * | 11/1999 | Miyazaki | 600/175 |
| 6,008,949 A | | 12/1999 | Sugawara | |
| 6,363,225 B1 | | 3/2002 | Sugawara | |
| 6,414,791 B1 | | 7/2002 | Sugawara | 359/497 |

FOREIGN PATENT DOCUMENTS

JP          6-327036         11/1994

* cited by examiner

*Primary Examiner*—Audrey Chang
(74) *Attorney, Agent, or Firm*—Fitzpatrick, Cella, Harper & Scinto

(57) ABSTRACT

A stereoscopic image pickup system for obtaining parallactic images of an object, the stereoscopic image pickup system includes a pair of, first and second, reflecting members each having a reflecting function, a pair of, first and second, amount-of-light control members arranged to respectively vary amounts of transmission of light fluxes coming from the first and second reflecting members alternately in a time-series manner, an optical member arranged to superpose an optical axis of a light flux having passed through the first reflecting member and the first amount-of-light control member and an optical axis of a light flux having passed through the second reflecting member and the second amount-of-light control member on one and the same optical axis, an image sensor for converting a light flux coming from the optical member into an electrical signal, and a controller for causing, on the basis of information on a distance to the object, an image taking-in area of the image sensor to differ between a first image formed on the image sensor by the light flux having passed through the first reflecting member and the first amount-of-light control member and a second image formed on the image sensor by the light flux having passed through the second reflecting member and the second amount-of-light control member.

21 Claims, 8 Drawing Sheets

STEREOSCOPIC IMAGE PICKUP SYSTEM

BACKGROUND OF THE INVENTION

1. Field of the Invention

The present invention relates to a stereoscopic image pickup apparatus arranged to perform stereoscopic photography by leading right and left images having parallax (parallactic images) alternately in a time-series manner to one image sensor.

2. Description of Related Art

Heretofore, there has been proposed, for example, in Japanese Laid-Open Patent Application No. Hei 6-327036, a stereoscopic image pickup apparatus arranged to perform stereoscopic photography by leading images having parallax for right and left eyes alternately in a time-series manner to one and the same area of one image sensor by means of a liquid crystal shutter. FIG. 11 shows such a stereoscopic image pickup apparatus. The stereoscopic image pickup apparatus shown in FIG. 11 is composed of two right reflecting mirrors 2 and 4, two left reflecting mirrors 1 and 3, a liquid crystal shutter 7 arranged to be drivable in a divisional manner in area, and a photographic lens 5. The liquid crystal shutter 7 is disposed in the vicinity of an entrance pupil of the photographic lens 5 on the object side of the photographic lens 5, so that right and left images having parallax can be alternately made incident on one image sensor.

In the conventional stereoscopic image pickup apparatus shown in FIG. 11, the reflecting mirrors 1 and 2 are disposed aslant with respect to the reflecting mirrors 3 and 4 in such a way that light beams emitted from one point, on an optical axis, of the object S meet at one point of the image plane 6 after having passed through the right and left pupils. Such a conventional stereoscopic image pickup apparatus will be described here with reference to FIGS. 2 to 4.

FIG. 2 is an optical path diagram which is equivalent to a case where an object located at a short distance is photographed by the above-mentioned conventional stereoscopic image pickup apparatus. Referring to FIG. 2, principal planes RLH and LLH of right and left photographic lenses RL and LL are parallel with right and left image pickup planes RFP' and LFP', respectively, and the principal planes RLH and LLH of the right and left photographic lenses RL and LL are slanting with respect to an object plane OBP. Optical axes of the right and left photographic lenses RL and LL are denoted by AXR and AXL, respectively. In this case, the distances from the principal planes RLH and LLH of the right and left photographic lenses RL and LL to the object plane OBP vary with the positions (the right end, the center and the left end) on the object plane OBP. Accordingly, right and left images RFP and LFP formed respectively on the right and left image pickup planes RFP' and LFP' are caused to have trapezoidal distortions which differ in directivity.

Therefore, if a right-side image RFP and a left-side image LFP are superposed on each other in such a way that points on the optical axes AXR and AXL of the right and left photographic lenses RL and LL coincide with each other, as shown in FIG. 3, an image deviation ULD in the vertical direction and an image deviation RLD in the horizontal direction would occur at diagonal positions of rectangular images RFP and LFP. Thus, if an image deviation in the vertical direction is large, it becomes difficult for right and left images to fuse with each other at the time of observation, and, if an image deviation in the horizontal direction is large, depth perception would vary between the central image portion and the right and left end image portions at the time of observation.

FIG. 4 is an explanatory diagram for explaining a case where a stereoscopic image photographed by the arrangement shown in FIG. 2 is displayed on an image display device DSP, such as a liquid crystal display device or a CRT display device, and is then observed by the viewer with the right eye REYE and the left eye LEYE. Referring to FIG. 4, the image deviation RLD in the horizontal direction shown in FIG. 3 causes a stereoscopic image OBIM of an object to be observed in a curved manner away from the image display device at the marginal portion of the image.

As mentioned in the foregoing, the stereoscopic image pickup apparatus configured with the so-called intersection method, in which the right and left optical axes of the photographing optical system are made to intersect at an arbitrary distance, has such a theoretical problem as described above in photographing a short-distance object.

BRIEF SUMMARY OF THE INVENTION

It is an object of the invention to realize a stereoscopic image pickup system capable of photographing a short-distance stereoscopic image, in which no trapezoidal distortion occurs in stereoscopically photographing a short-distance object, and marginal portions of right and left images easily fuse with each other at the time of observation with any unnatural curvature of field not being observed.

To attain the above object, in accordance with a first aspect of the invention, there is provided a stereoscopic image pickup system for obtaining parallactic images of an object, the stereoscopic image pickup system comprising a pair of, first and second, reflecting members each having a reflecting function, a pair of, first and second, amount-of-light control members arranged to respectively vary amounts of transmission of light fluxes coming from the first and second reflecting members alternately in a time-series manner, an optical member arranged to superpose an optical axis of a light flux having passed through the first reflecting member and the first amount-of-light control member and an optical axis of a light flux having passed through the second reflecting member and the second amount-of-light control member on one and the same optical axis, an image sensor for converting a light flux coming from the optical member into an electrical signal, and a controller for causing, on the basis of information on a distance to the object, an image taking-in area of the image sensor to differ between a first image formed on the image sensor by the light flux having passed through the first reflecting member and the first amount-of-light control member and a second image formed on the image sensor by the light flux having passed through the second reflecting member and the second amount-of-light control member.

In accordance with a preferred aspect of the invention, the stereoscopic image pickup system further comprises a pair of front lens units of negative refractive power disposed on a side nearer to the object than the optical member, and a rear lens unit of positive refractive power disposed between the optical member and the image sensor.

In accordance with a preferred aspect of the invention, in the stereoscopic image pickup system, the rear lens unit includes a magnification varying lens unit consisting of at least two lens units, and the controller causes, in accordance with the information on the distance to the object and a magnification varying position of the magnification varying lens unit, the image taking-in area to differ between the first image and the second image on the image sensor.

In accordance with a preferred aspect of the invention, in the stereoscopic image pickup system, the rear lens unit further includes a lens unit disposed between the optical member and the magnification varying lens unit and arranged to be movable along an optical axis of the rear lens unit so as to compensate for defocusing due to a change of the distance to the object.

In accordance with a preferred aspect of the invention, in the stereoscopic image pickup system, the pair of, first and second, amount-of-light control members are disposed between the optical member and one of the pair of front lens units and between the optical member and the other of the pair of front lens units, respectively.

In accordance with a preferred aspect of the invention, in the stereoscopic image pickup system, the optical axis of the light flux having passed through the first reflecting member and the first amount-of-light control member and the optical axis of the light flux having passed through the second reflecting member and the second amount-of-light control member are parallel with each other on a side nearer to the object than the pair of, first and second, reflecting members.

In accordance with a preferred aspect of the invention, in the stereoscopic image pickup system, the pair of, first and second, reflecting members are arranged to be rotatable around respective predetermined axes, and the controller causes, in accordance with a rotational angle of each of the pair of, first and second, reflecting members and the information on the distance to the object, the image taking-in area to differ between the first image and the second image on the image sensor.

In accordance with a preferred aspect of the invention, the stereoscopic image pickup system further comprises a pair of amount-of-light attenuating members for adjusting an amount of light, between the first reflecting member and the optical member and between the second reflecting member and the optical member, respectively.

In accordance with a preferred aspect of the invention, the stereoscopic image pickup system further comprises a distance detector for detecting the information on the distance to the object.

In accordance with a preferred aspect of the invention, in the stereoscopic image pickup system, the controller computes, in accordance with a result of detection provided by the distance detector, an amount of shifting by which the image taking-in area is shifted between the first image and the second image on the image sensor.

In accordance with a preferred aspect of the invention, in the stereoscopic image pickup system, the controller performs a shifting action on the image taking-in area between the first image and the second image on the image sensor in synchronism with operations of the pair of, first and second, amount-of-light control members.

In accordance with a preferred aspect of the invention, the stereoscopic image pickup system further comprises a distance detector for detecting the information on the distance to the object, and a magnification varying position detector for detecting a magnification varying position of the magnification varying lens unit.

In accordance with a preferred aspect of the invention, in the stereoscopic image pickup system, the controller computes, in accordance with a result of detection provided by the distance detector and a result of detection provided by the magnification varying position detector, an amount of shifting by which the image taking-in area is shifted between the first image and the second image on the image sensor.

In accordance with a preferred aspect of the invention, in the stereoscopic image pickup system, the controller performs a shifting action on the image taking-in area between the first image and the second image on the image sensor in synchronism with operations of the pair of, first and second, amount-of-light control members.

In accordance with a preferred aspect of the invention, the stereoscopic image pickup system further comprises a storage device for storing therein an image signal outputted from the image sensor.

Further, to attain the above object, in accordance with a second aspect of the invention, there is provided a stereoscopic image pickup optical system for obtaining parallactic images of an object, the stereoscopic image pickup optical system comprising a pair of front optical units having respective optical axes parallel with each other on the object side and arranged to respectively vary amounts of transmission of light fluxes coming from the object alternately in a time-series manner, an optical member arranged to superpose the respective optical axes of the pair of front optical units on one and the same optical axis, a rear optical unit disposed in such a manner that the superposed optical axes of the pair of front optical units coincide with an optical axis of the rear optical unit, an image sensor for converting a light flux coming from the rear optical unit into an electrical signal, and a controller for varying an image taking-in area of the image sensor in synchronism with varying alternately the amounts of transmission of light fluxes respectively passing through the pair of front optical units.

In accordance with a preferred aspect of the invention, in the stereoscopic image pickup optical system, the pair of front optical units include a pair of shutters arranged to respectively vary the amounts of transmission of light fluxes coming from the object alternately in a time-series manner, and the controller controls opening and closing of the pair of shutters.

In accordance with a preferred aspect of the invention, the stereoscopic image pickup optical system further comprises an iris disposed at a position where the respective optical axes of the pair of front optical units are superposed, or disposed in the vicinity of the position.

In accordance with a preferred aspect of the invention, in the stereoscopic image pickup optical system, the rear optical unit includes a plurality of lens units arranged to move along an optical axis thereof for focusing or for variation of magnification.

The above and further objects and features of the invention will become apparent from the following detailed description of preferred embodiments thereof taken in conjunction with the accompanying drawings.

DETAILED DESCRIPTION OF THE INVENTION

Hereinafter, preferred embodiments of the invention will be described in detail with reference to the drawings.

Figure 1:
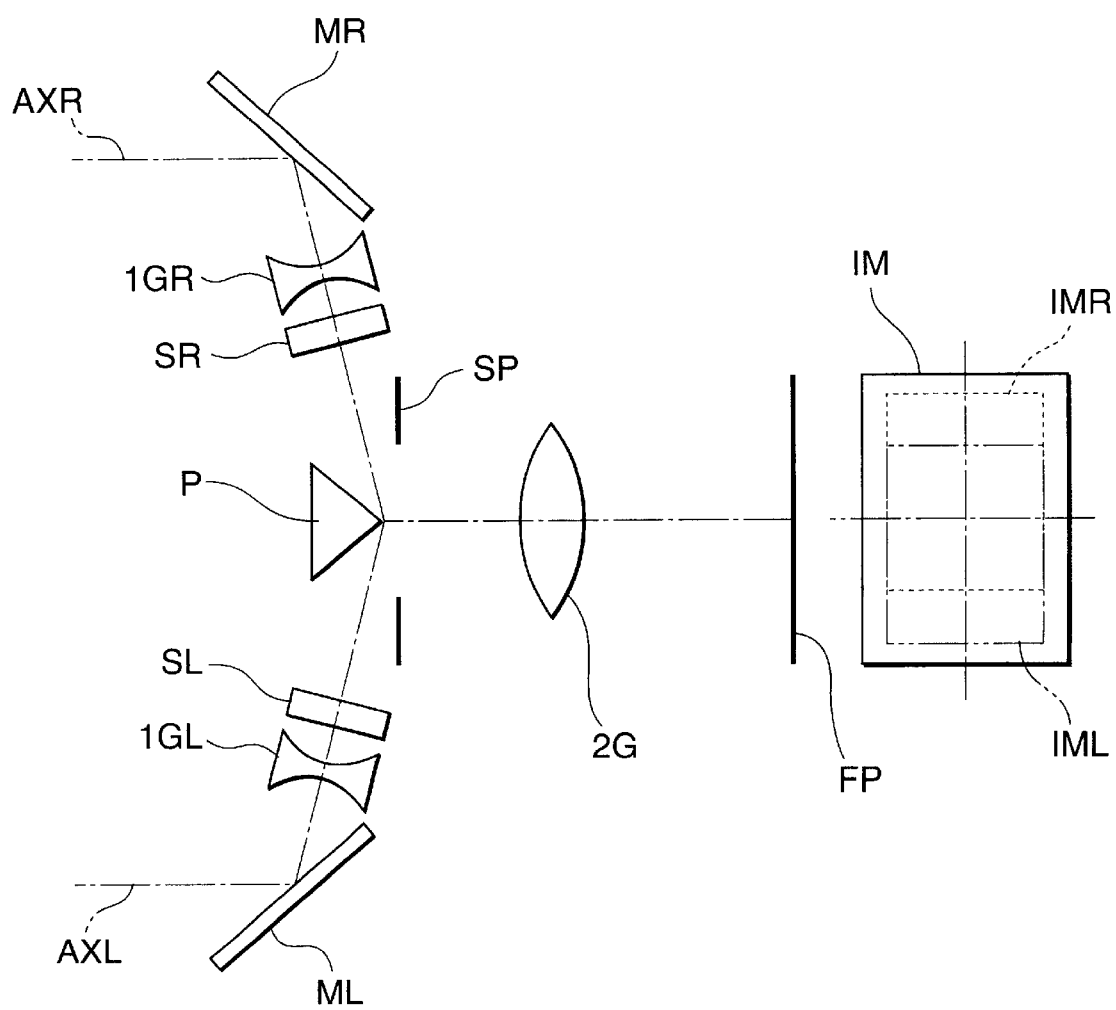
FIG. 1 is an optical diagram showing the arrangement of a stereoscopic image pickup apparatus according to a first embodiment of the invention.
Figure 2:
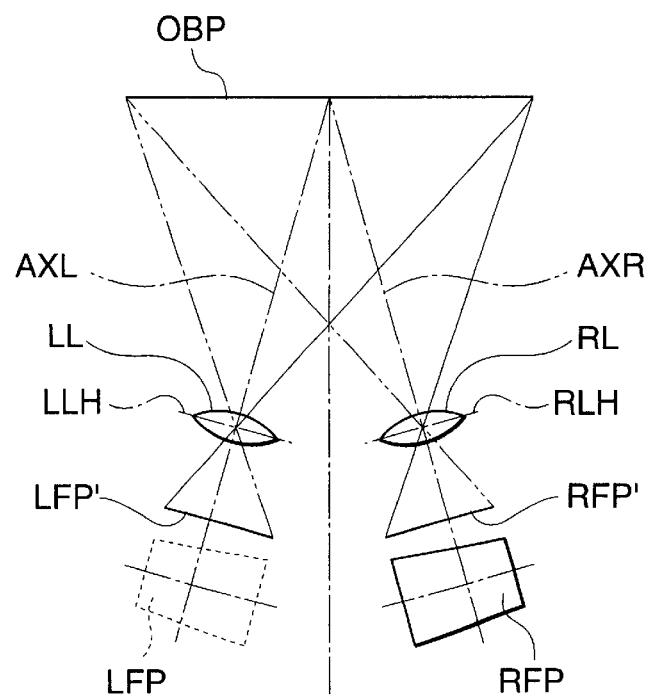
FIG. 2 is an explanatory diagram for explaining the occurrence of trapezoidal distortion in a conventional stereoscopic image pickup apparatus with the intersection method.
Figure 3:
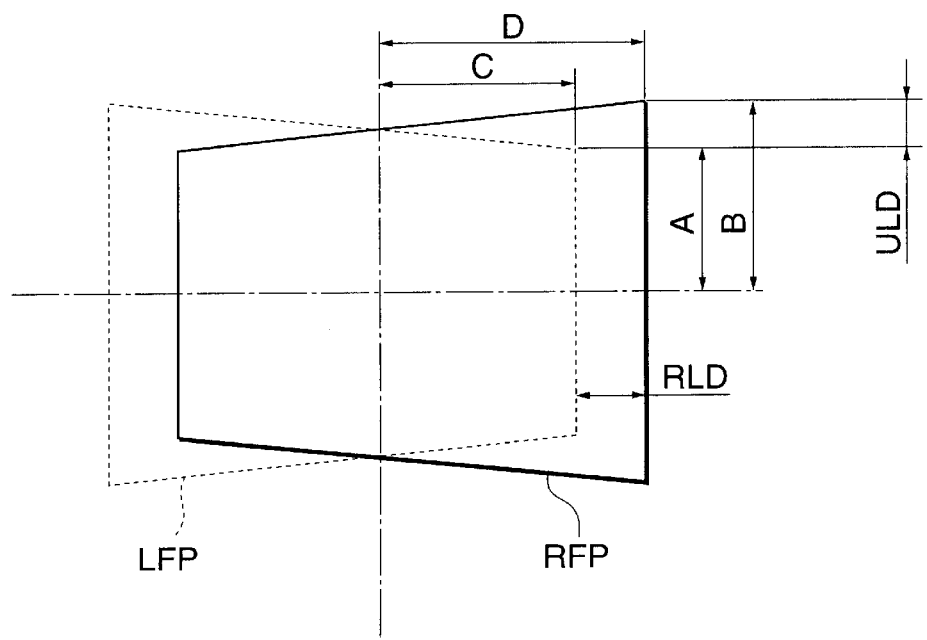
FIG. 3 is an explanatory diagram for explaining right and left images formed on an image sensor in the conventional stereoscopic image pickup apparatus with the intersection method.
Figure 4:
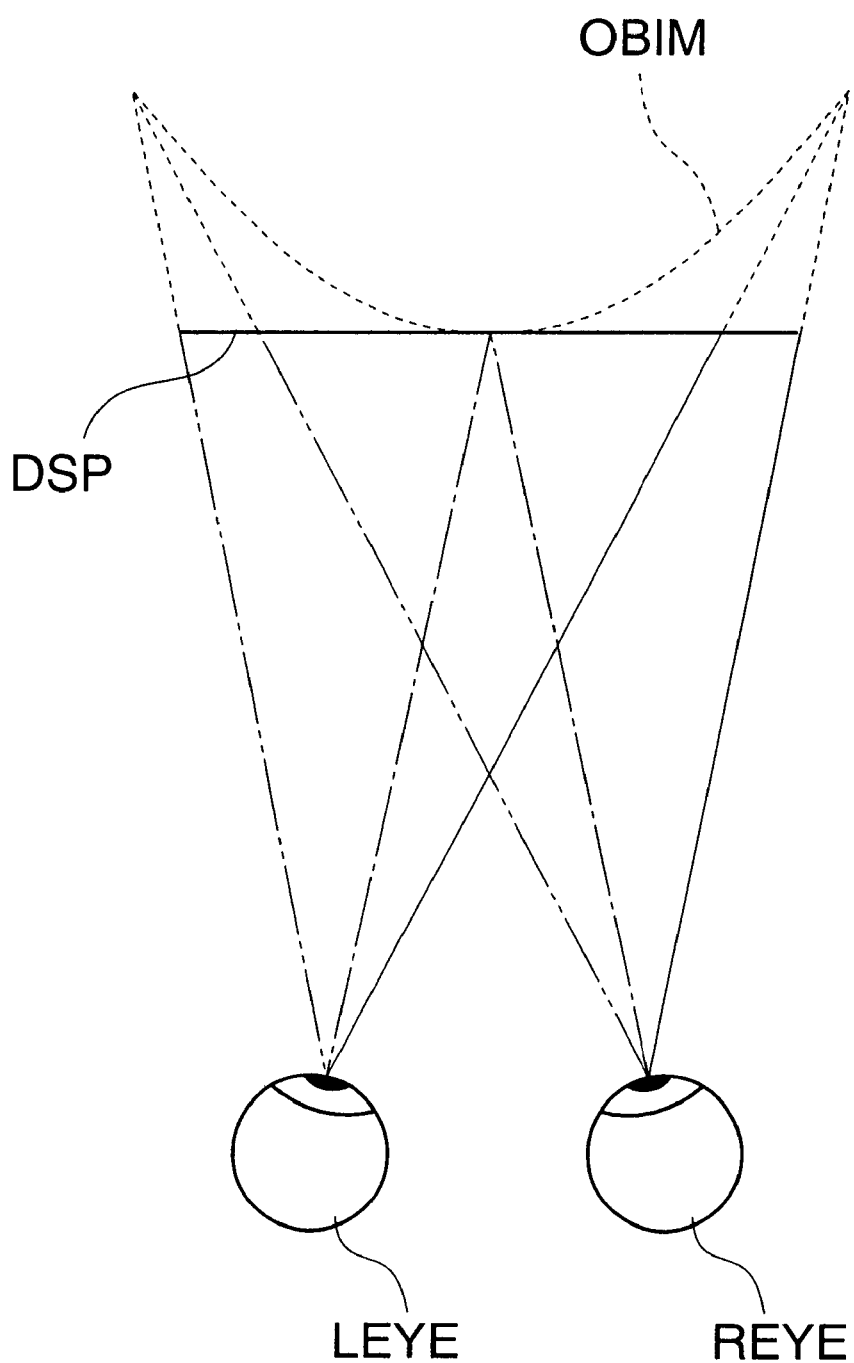
FIG. 4 is an explanatory diagram for explaining the observation of a stereoscopic image obtained by the conventional stereoscopic image pickup apparatus with the intersection method.

FIG. 1 is an optical diagram showing the arrangement of a stereoscopic image pickup apparatus according to a first embodiment of the invention. In the arrangement shown in FIG. 1, there are disposed, in order from the object side, two, right and left, reflecting mirrors MR and ML fixed constantly and arranged to deflect inwards right and left optical axes AXR and AXL disposed in parallel with each other at an interval about equal to the interpupillary distance of the man, two, right and left, first lens units 1GR and 1GL of negative refractive power, two, right and left, liquid crystal shutters SR and SL, a triangular prism P disposed at the position of or in the vicinity of a stop SP and arranged to combine optical paths of two, right and left, images by superposing the two, right and left, optical axes AXR and AXL on each other, the stop SP arranged to adjust the amount of light, a second lens unit 2G of positive refractive power as a whole, and an image sensor FP.

The image sensor FP, which is, for example, a CCD or the like, is arranged to take in an image in a periodical manner and to perform a shifting action for changing image taking-in areas for taking in right and left images, in synchronism with opening and closing of the liquid crystal shutters SR and SL, on the basis of object distance information (information on the distance to the object) outputted from a distance measuring device (not shown). The two, right and left, liquid crystal shutters SR and SL are alternately opened and closed (i.e., opening and closing of the shutters SR and SL are repeated in such a way that, when the liquid crystal shutter SL is opened, the liquid crystal shutter SR is closed, and, when the liquid crystal shutter SR is opened, the liquid crystal shutter SL is closed), so that right and left in-focus images having parallax of one and the same object are led to an image pickup plane of the image sensor FP alternately in a time-series manner.

Referring to FIG. 1, in a case where the object distance is short, the image taking-in area of the image sensor FP to be set when the right liquid crystal shutter SR only is opened is a range indicated by a broken line IMR, which is smaller than an entire image pickup plane (the entirety of an area from which an image can be taken in) IM, and the image taking-in area of the image sensor FP to be set when the left liquid crystal shutter SL only is opened is a range indicated by a two-dot chain line IML, which is smaller than the entire image pickup plane IM.

Thus, the right and left optical axes AXR and AXL of the stereoscopic image pickup apparatus are set parallel with each other, and the ranges of the image taking-in area of the image sensor FP are made to alternately shift in accordance with a change of the distance to the object and the opening and closing of the liquid crystal shutters SR and SL. Accordingly, it becomes possible to perform stereoscopic photography without the occurrence of trapezoidal distortion even in photographing a short-distance object.

Figure 5:
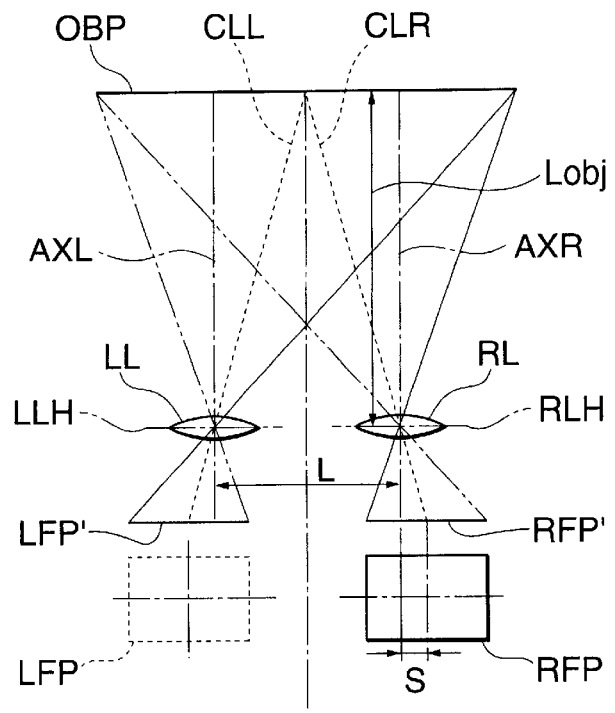
FIG. 5 is an explanatory diagram for explaining the principle of the parallel method according to the invention.

FIG. 5 is an optical diagram for explaining the principle owing to which no trapezoidal distortion occurs in photographing a short-distance object. Referring to FIG. 5, principal planes RLH and LLH of right and left photographic lenses RL and LL are disposed in parallel with image pickup planes RFP' and LFP', and optical axes AXR and AXL of the right and left photographic lenses RL and LL are set parallel with each other.

Figure 6:
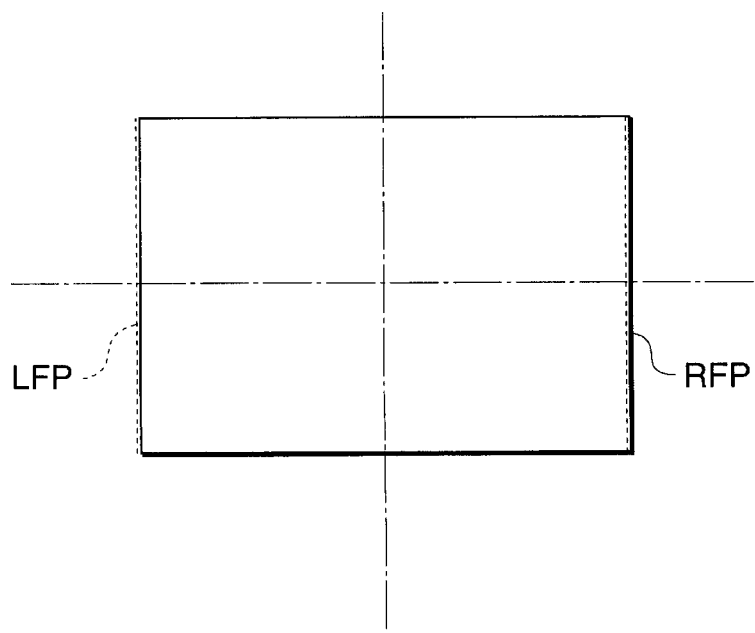
FIG. 6 is an explanatory diagram for explaining right and left images formed on an image sensor with the parallel method according to the invention.

In this instance, even if the object plane OBP is at a short distance, no trapezoidal distortion occurs at the right and left picked-up images RFP and LFP formed on the right and left image pickup planes RFP' and LFP', as shown in FIG. 5. FIG. 6 is a diagram showing an image plane obtained by superposing on each other the right and left picked-up images RFP and LFP picked up by the stereoscopic image pickup apparatus having the arrangement shown in FIG. 5, with the center of each of the picked-up images RFP and LFP (a point on each of the lines CLR and CLL) serving as a point of reference. Referring to FIG. 6, no image deviation occurs both in the horizontal direction and the vertical direction even at the marginal portions of the image plane.

Figure 7:
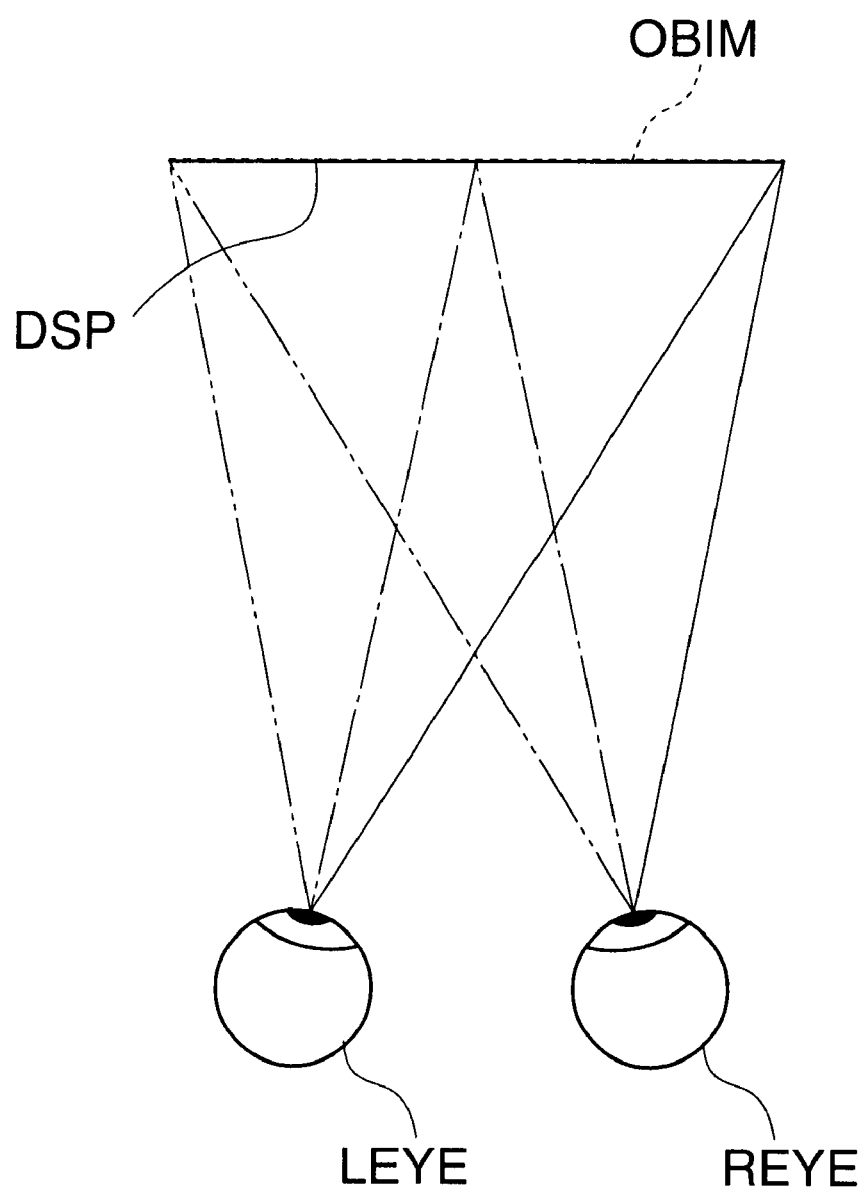
FIG. 7 is an explanatory diagram for explaining the observation of a stereoscopic image obtained with the parallel method according to the invention.

FIG. 7 is an explanatory diagram for explaining a case where the right and left picked-up images RFP and LFP picked up by the stereoscopic image pickup apparatus having the arrangement shown in FIG. 5 are displayed on an image display device DSP, such as a liquid crystal display device or a CRT display device, and are then observed by the viewer with the right eye REYE and the left eye LEYE, respectively. In the case of the first embodiment, no unnatural curvature of field of the stereoscopic image OBIM for the image display device DSP is observed.

The stereoscopic image pickup apparatus according to the first embodiment shown in FIG. 1 has the same function as that of the arrangement shown in FIG. 5, because the right and left optical axes AXR and AXL are parallel with each other, and, therefore, the principal planes of the photographic lenses are always parallel with the image pickup plane of the image sensor FP.

The right and left liquid crystal shutters SR and SL are respectively disposed between the associated one of the right and left first lens units 1GR and 1GL of negative refractive power and the triangular prism P, so that an angle of incidence of an off-axial principal ray on each of the right and left liquid crystal shutters SR and SL is made small. Accordingly, a leakage of light occurring at the time of closing of the liquid crystal shutter SR or SL over the entirety of the image pickup plane of the image sensor FP is made small. With the liquid crystal shutters SR and SL respectively disposed closer to the triangular prism P than the first lens units 1GR and 1GL, a maximum angle of incidence of a light flux on the liquid crystal shutter SR or SL can be reduced to half or smaller as compared with a case where the liquid crystal shutters SR and SL are respectively disposed on the object side of the first lens units 1GR and 1GL.

Further, the first lens units 1GR and 1GL of negative refractive power are respectively disposed on the object side of the triangular prism P serving as an optical path combining means, so that the whole stereoscopic image pickup apparatus is formed into a retro-focus construction. Accordingly, it becomes easy to obtain the sufficient back focal distance and to realize a wide angle of view. In addition, as against the increase of an angle of incidence of an off-axial principal ray on the surface of the liquid crystal shutter SR or SL due to the realization of a wide angle of view, each of the first lens units 1GR and 1GL is made to have a negative refractive power, so that an angle of incidence of an off-axial principal ray on the surface of the liquid crystal shutter SR or SL in the vicinity of the stop SP can be made small.

Figure 8:
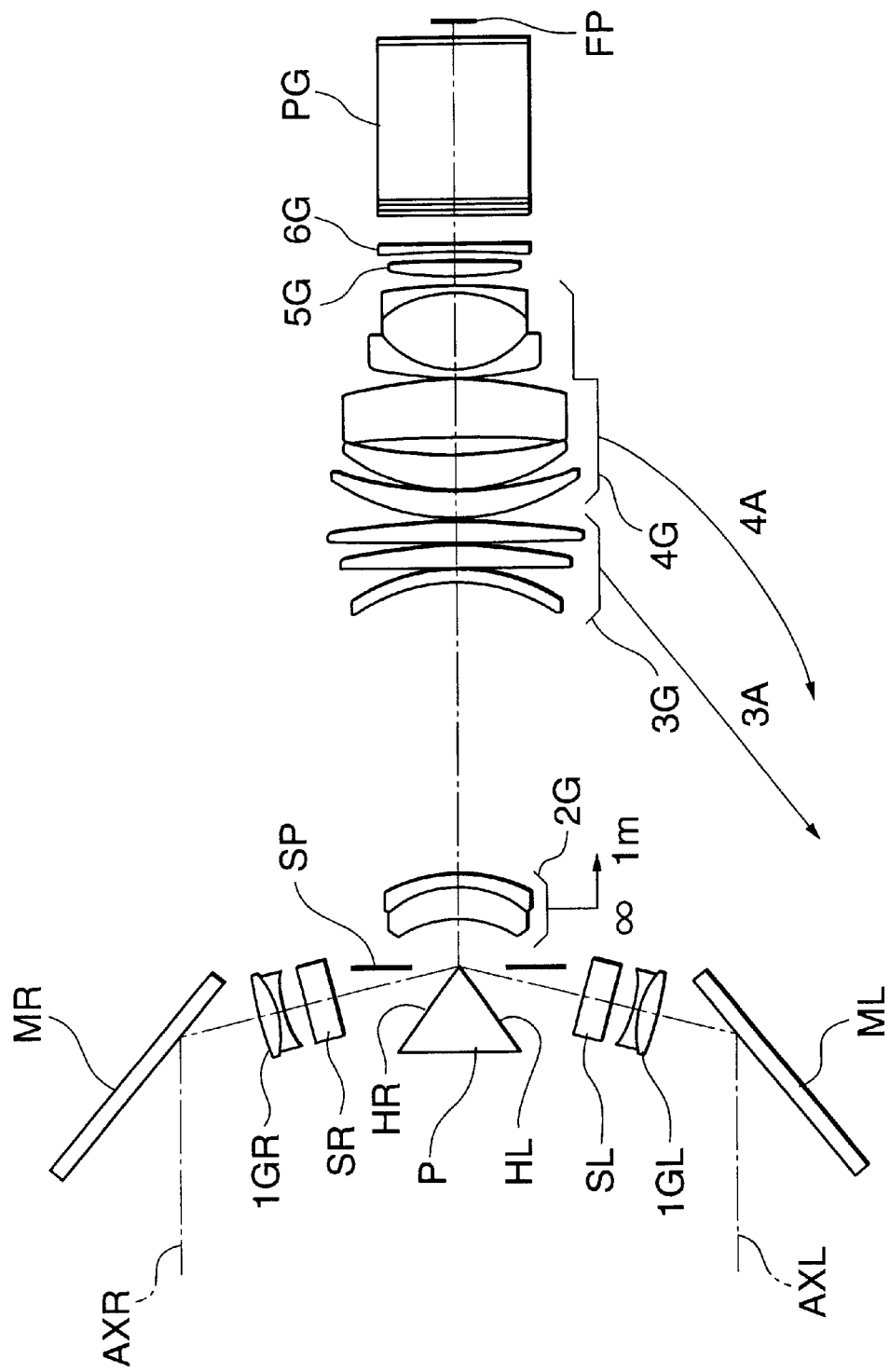
FIG. 8 is an optical diagram showing the arrangement of a stereoscopic image pickup apparatus according to a second embodiment of the invention.

FIG. 8 is an optical diagram showing the arrangement of a stereoscopic image pickup apparatus according to a second embodiment of the invention. In the case of the second embodiment, a zoom lens is included in the stereoscopic image pickup apparatus. In FIG. 8, members having the same functions as those of the members shown in FIG. 1 are denoted by the same reference characters as in FIG. 1.

In the arrangement shown in FIG. 8, there are disposed, in order from the object side, two, right and left, reflecting mirrors MR and ML fixed constantly and arranged to deflect inwards right and left optical axes AXR and AXL disposed in parallel with each other at an interval about equal to the interpupillary distance of the man, two, right and left, first lens units 1GR and 1GL of negative refractive power, two, right and left, liquid crystal shutters SR and SL, a triangular prism P disposed at the position of or in the vicinity of a stop SP and arranged to combine optical paths of two, right and left, images by superposing the two, right and left, optical axes AXR and AXL on each other, the stop SP arranged to adjust the amount of light, a second lens unit 2G having a weak refractive power and arranged to be movable along the optical axis in accordance with a change of the distance to an object, a third lens unit 3G of positive refractive power as a whole, a fourth lens unit 4G of positive refractive power as a whole, a fifth lens unit 5G of positive refractive power as a whole, a sixth lens unit 6G of negative refractive power as a whole, a color separation prism PG, and an image sensor FP.

The second lens unit 2G, the third lens unit 3G, the fourth lens unit 4G, the fifth lens unit 5G and the sixth lens unit 6G constitute a rear lens unit. In the rear lens unit, the second lens unit 2G is arranged to be movable along the optical axis so as to compensate for defocusing due to a change of the distance to the object, and the third lens unit 3G and the fourth lens unit 4G are variator lens units. During the variation of magnification from the wide-angle end to the telephoto end, the third lens unit 3G and the fourth lens unit 4G move from the side of the image sensor FP to the object side, as indicated by arrows 3A and 4A, respectively, so as to effect the variation of magnification and the compensation for the shift of an image plane due to the variation of magnification. At the time of the assembly and adjustment of lenses, the fifth lens unit 5G is made movable along the optical axis so as to absorb the unevenness in the back focal distance. Further, at the time of the assembly and adjustment of lenses, the first lens units 1GR and 1GL are made movable independent of each other along the optical axis so as to correct the discrepancy in the position of the image plane between the wide-angle end and the telephoto end during the variation of magnification.

Three color images obtained by the color separation prism PG having the role of separating light from the object into three primary color components are picked up by three image sensors FP which are respectively provided for the three primary color images and disposed at the optically equivalent positions. (While, in the following description, an explanation is made only about one primary color image, the same explanation applies also to the other primary color images.)

Similarly to the arrangement in the first embodiment, the right and left liquid crystal shutters SR and SL are alternately opened and closed, so that two, right and left, images having parallax of one and the same object are led alternately in a time-series manner onto the image sensor FP. Then, in synchronism with the opening and closing of the liquid crystal shutters SR and SL, a shifting action for changing image taking-in areas of the image sensor FP for taking in the right and left images is performed. The amount of shifting in performing the shifting action is set in accordance with the distance to the object and the zoom position.

The right and left liquid crystal shutters SR and SL are respectively disposed between the associated one of the right and left first lens units 1GR and 1GL of negative refractive power and the triangular prism P, so that an angle of incidence of an off-axial principal ray on each of the right and left liquid crystal shutters SR and SL is made small. Accordingly, a leakage of light occurring at the time of closing of the liquid crystal shutter SR or SL over the entirety of the image pickup plane of the image sensor FP is made small. With the liquid crystal shutters SR and SL respectively disposed closer to the triangular prism P than the first lens units 1GR and 1GL, a maximum angle of incidence of a light flux on the liquid crystal shutter SR or SL can be reduced to half or smaller as compared with a case where the liquid crystal shutters SR and SL are respectively disposed on the object side of the first lens units 1GR and 1GL.

Further, the first lens units 1GR and 1GL of negative refractive power are respectively disposed on the object side of the triangular prism P serving as an optical path combining means, so that the whole stereoscopic image pickup apparatus is formed into a retro-focus construction. Accordingly, it becomes easy to obtain the sufficient back focal distance and to realize a wide angle of view. In addition, as against the increase of an angle of incidence of an off-axial principal ray on the surface of the liquid crystal shutter SR or SL due to the realization of a wide angle of view, each of the first lens units 1GR and 1GL is made to have a negative refractive power, so that an angle of incidence of an off-axial principal ray on the surface of the liquid crystal shutter SR or SL in the vicinity of the stop SP can be made small.

As shown in FIG. 8, the entrance pupil (stop) SP of the stereoscopic image pickup apparatus is provided on the object side of the zoom lens inside the stereoscopic image pickup apparatus, and the triangular prism P is arranged such that, at the entrance pupil SP, optical paths for the right and left images are combined. With this construction, the diameter of a front lens member of the stereoscopic image pickup apparatus can be made small, and the spread of an off-axial light flux on the object side can be restrained. Accordingly, the two, right and left, reflecting mirrors MR and ML and the two, right and left, shutters SR and SL can be reduced in size, so that it is possible to realize a stereoscopic image pickup apparatus which is small-sized as a whole.

Further, an included angle (apex angle) which two, right and left, reflecting surfaces HR and HL of the triangular prism P make with each other can be set to an appropriate value, for example, 75 degrees, taking into consideration the eclipse of an effective light flux due to the stop SP or the reduction in size of the reflecting mirrors MR and ML.

Further, in the construction according to the second embodiment, since the variation of magnification is performed by the single rear lens unit after the respective optical paths of the right and left images are combined by the triangular prism P, there is such an advantage that the difference in magnification between right and left images or the discrepancy of the optical axes during the variation of magnification does not occur.

Further, focusing and zooming are effected by the rear lens unit disposed between the optical path combining means (triangular prism) P and the image sensor FP, so that no deviation in the right and left optical axes occurs. Accordingly, it is possible to realize a stereoscopic image pickup apparatus which is very advantageous in usability.

In each of the first and second embodiments described above, in order to further adjust the amount of light, an amount-of-light attenuating filter may be inserted into and removed from a space between the first lens unit 1GR or 1GL and the reflecting mirror MR or ML, or between the first lens unit 1GR or 1GL and the triangular prism P, according to the brightness of an object.

Further, the reflecting mirrors MR and ML may be arranged to be rotatable around the vertical axis (the axis perpendicular to the plane of the drawing of FIG. 1 or FIG. 8), thereby reducing the amount of shifting of the image taking-in area of the image sensor FP (not making the amount of shifting zero). In this case, while trapezoidal distortion occurs, it is possible to reduce the degree of trapezoidal distortion to such a level as to have no problem, as compared with a case where no shifting action on the image taking-in area is effected.

Further, the triangular prism P may be composed of two plane mirrors for the purpose of cost reduction. Further, the reflecting mirrors MR and ML may be composed of reflecting prisms. By this arrangement, the spread of an off-axial light flux is suppressed, so that it is possible to realize a stereoscopic image pickup apparatus which is more reduced in size.

Figure 9:
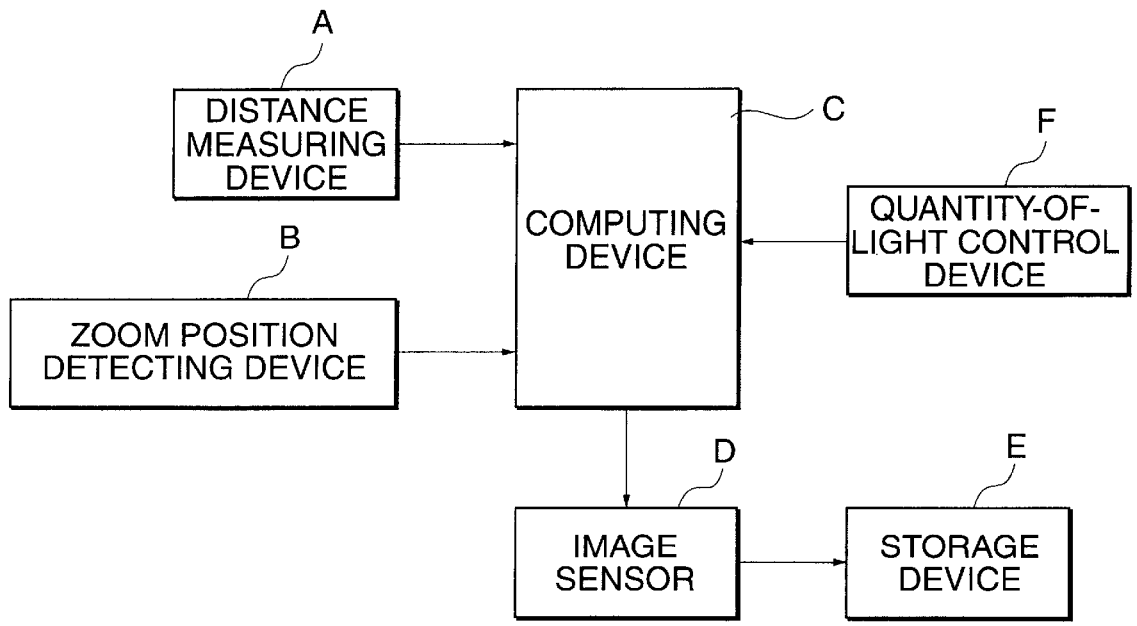
FIG. 9 is a block diagram showing the circuit arrangement of the stereoscopic image pickup apparatus according to each of the first and second embodiments of the invention.

FIG. 9 is a block diagram showing the circuit arrangement of the stereoscopic image pickup apparatus according to each of the first and second embodiments described above. Referring to FIG. 9, a distance measuring device A measures the distance to an object by utilizing the principle of the trigonometric distance measurement and outputs object distance information. A zoom position detecting device B detects the zoom position of the photographic lens and outputs zoom position information. An amount-of-light control device F controls the opening and closing of the right and left liquid crystal shutters SR and SL in the above-described manner. A computing device C performs a computing operation for deciding the image taking-in area of an image sensor D on the basis of the object distance information outputted from the distance measuring device A and the zoom position information outputted from the zoom position detecting device B. A storage device E stores therein image information outputted from the image sensor D.

The computing device C issues a command to cause the image sensor D to alternately perform, in synchronism with an opening-and-closing signal for the liquid crystal shutters SR and SL outputted from the amount-of-light control device F, a left-image taking-in action in which an image in the left image taking-in area decided by the above computing operation is picked up to take in left image information obtained when the left liquid crystal shutter SL is opened and a right-image taking-in action in which an image in the right image taking-in area decided by the above computing operation is picked up to take in right image information obtained when the right liquid crystal shutter SR is opened.

Referring to FIG. 5, the amount of shifting S, from the optical axis, of the center position in the horizontal direction of each of the right and left image taking-in areas is found from the following equation:

$$S = fobj*(L/2)/(Lobj-fobj)$$

where L is the interval between the right optical axis and the left optical axis of the stereoscopic image pickup apparatus, fobj is the focal length of the entire optical system of the stereoscopic image pickup apparatus, and Lobj is the object distance.

The object distance Lobj is outputted from the distance measuring device A, and a coefficient corresponding to an arbitrary zoom position with respect to the focal length of the entire optical system at the wide-angle end is outputted from the zoom position detecting device B (thereby, the focal length fobj being obtained). Then, the amount of shifting S of the image taking-in area is computed by the computing device C using the above equation.

Figure 10:
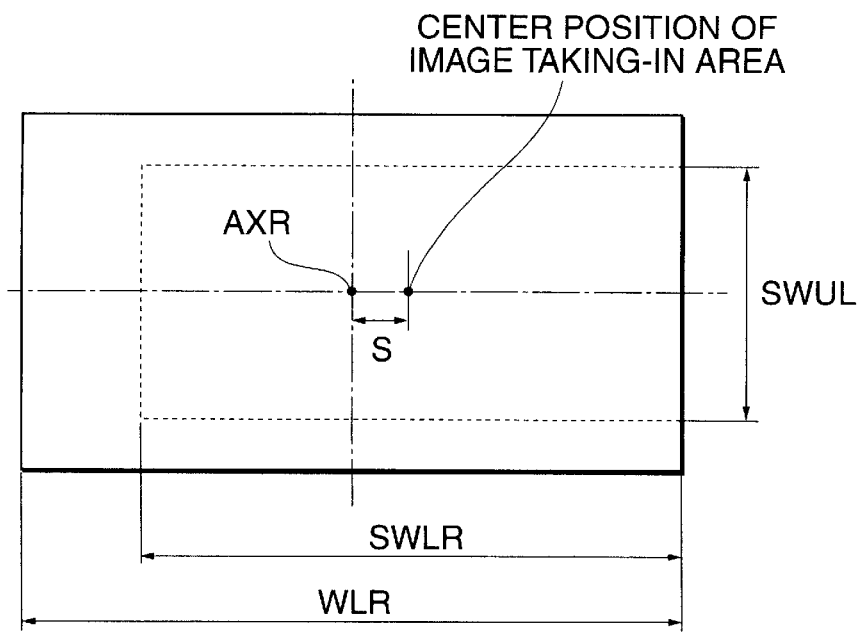
FIG. 10 is an explanatory diagram for explaining an image taking-in area according to the invention.
Figure 11:
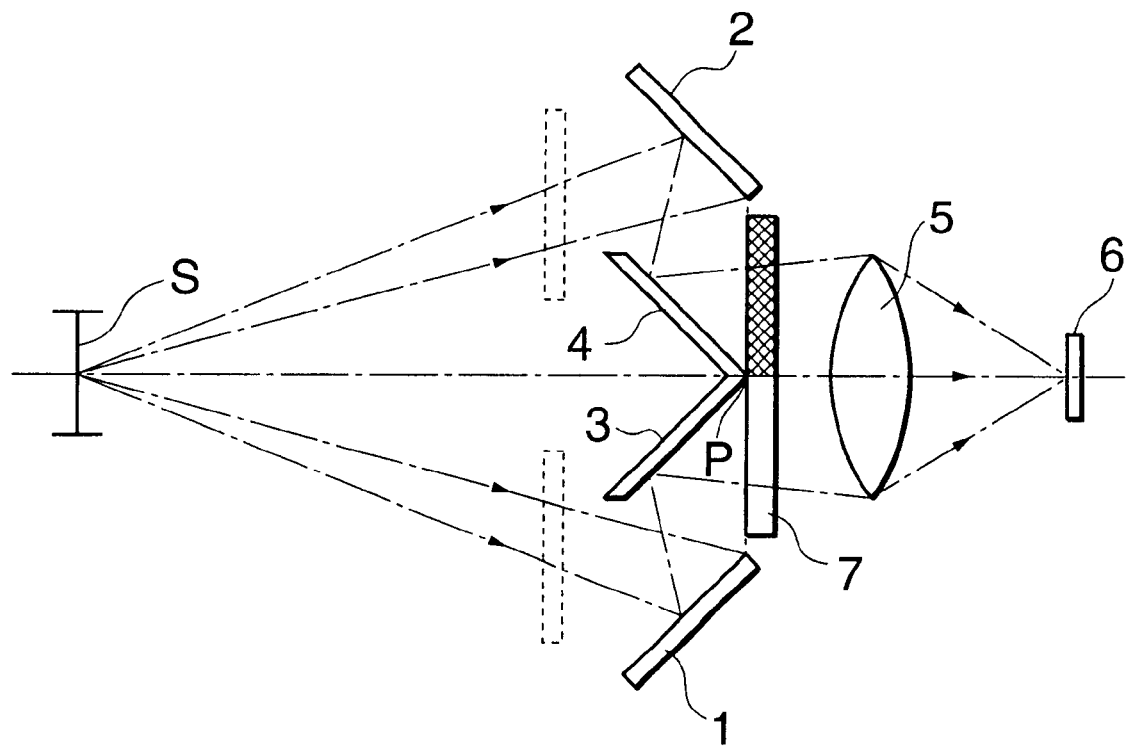
FIG. 11 is a schematic diagram showing the arrangement of the conventional stereoscopic image pickup apparatus.

Further, referring to FIG. 10, the horizontal width SWLR of the image taking-in area during the shifting action can be found from the following equation:

$$SWLR = (WLR/2 - S)*2$$

where WLR is the horizontal width of an effective area of the image sensor D. In addition, the vertical width SWUL of the image taking-in area during the shifting action can be decided by multiplying the horizontal width SWLR by an arbitrary aspect ratio of the image plane.

Then, according to the above computing operation performed at the computing device C, the image taking-in area corresponding to the object distance and a change of the zoom position is decided.

As has been described in the foregoing, according to the stereoscopic image pickup apparatus of the invention, a shifting action on the image taking-in area of the image sensor corresponding to the object distance or to the object distance and the zoom position is performed. Accordingly, no trapezoidal distortion occurs even in stereoscopically photographing a short-distance object. Further, two, right and left, images easily fuse with each other with respect to every object distance at the time of observation of the stereoscopic image, and any unnatural curvature of field does not occur, so that it is possible to make the stereoscopic image very comfortably viewable.

What is claimed is:

1. A stereoscopic image pickup system for obtaining parallactic images of an object, said stereoscopic image pickup system comprising:

first and second reflecting members each having a reflecting function;

first and second amount-of-light control members arranged to respectively vary amounts of transmission of light fluxes coming from said first and second reflecting members alternately in a time-series manner;

an optical member arranged to superpose an optical axis of a light flux having been reflected by said first reflecting member and passed through said first amount-of-light control member and an optical axis of a light flux having been reflected by said second reflecting member and passed through said second amount-of-light control member on one and the same optical axis, wherein the optical axis on the object side of said first reflecting member and the optical axis on the object side of said second reflecting member are parallel with each other;

an image sensor for converting a light flux coming from said optical member into an electrical signal; and a controller for causing, on the basis of information on a distance to the object, an image taking-in area of said image sensor to differ in position on said image sensor for (i) a first image formed on said image sensor by the light flux having been reflected by said first reflecting member and passed through said first amount-of-light control member and a (ii) second image formed on said image sensor by the light flux having been reflected by said second reflecting member and passed through said second amount-of-light control member, and wherein the different positions of the first and second images formed on said image sensor overlap.

2. A stereoscopic image pickup system according to claim 1, further comprising a pair of front lens units of negative refractive power disposed on a side nearer to the object than said optical member, and a rear lens unit of positive refractive power disposed between said optical member and said image sensor.

3. A stereoscopic image pickup system according to claim 2, wherein said rear lens unit includes a magnification varying lens unit consisting of at least two lens units, and said controller causes, in accordance with the information on the distance to the object and a magnification varying position of said magnification varying lens unit, the image taking-in area to differ between the first image and the second image on said image sensor.

4. A stereoscopic image pickup system according to claim 3, wherein said rear lens unit further includes a lens unit disposed between said optical member and said magnification varying lens unit and arranged to be movable along an optical axis of said rear lens unit so as to compensate for defocusing due to a change of the distance to the object.

5. A stereoscopic image pickup system according to claim 3, further comprising a distance detector for detecting the information on the distance to the object, and a position detector for detecting a position of said magnification varying lens unit.

6. A stereoscopic image pickup system according to claim 5, wherein said controller computes, in accordance with a result of detection provided by said distance detector and a result of detection provided by said position detector, an amount of shifting by which the image taking-in area is shifted between the first image and the second image on said image sensor.

7. A stereoscopic image pickup system according to claim 6, wherein said controller performs a shifting action on the image taking-in area between the first image and the second image on said image sensor in synchronism with operations of said first and second amount-of-light control members.

8. A stereoscopic image pickup system according to claim 2, wherein said first and second amount-of-light control members are disposed between said optical member and one of said pair of front lens units and between said optical member and the other of said pair of front lens units, respectively.

9. A stereoscopic image pickup system according to claim 1, wherein the optical axis of the light flux having passed through said first reflecting member and said first amount-of-light control member and the optical axis of the light flux having passed through said second reflecting member and said second amount-of-light control member are parallel with each other on a side nearer to the object than said first and second reflecting members.

10. A stereoscopic image pickup system according to claim 1, wherein said first and second reflecting members are arranged to be rotatable around respective predetermined axes, and said controller causes, in accordance with a rotational angle of each of said first and second reflecting members and the information on the distance to the object, the image taking-in area to differ between the first image and the second image on said image sensor.

11. A stereoscopic image pickup system according to claim 1, further comprising a pair of amount-of-light attenuating members for adjusting an amount of light, said pair of amount-of-light attenuating members being arranged along the optical axis between said first reflecting member and said optical member and between said second reflecting member and said optical member, respectively.

12. A stereoscopic image pickup system according to claim 1, further comprising a distance detector for detecting the information on the distance to the object.

13. A stereoscopic image pickup system according to claim 12, wherein said controller computes, in accordance with a result of detection provided by said distance detector, an amount of shifting by which the image taking-in area is shifted between the first image and the second image on said image sensor.

14. A stereoscopic image pickup system according to claim 13, wherein said controller performs a shifting action on the image taking-in area between the first image and the second image on said image sensor in synchronism with operations of said first and second amount-of-light control members.

15. A stereoscopic image pickup system according to claim 1, further comprising a storage device for storing therein an image signal outputted from said image sensor.

16. A stereoscopic image pickup optical system for obtaining parallactic images of an object, said stereoscopic image pickup optical system comprising:

a pair of front optical units having respective optical axes parallel with each other on the object side and comprising shutters for varying amounts of transmission of light fluxes coming from the object alternately in a time-series manner;

an optical member arranged to superpose the respective optical axes of said pair of front optical units on one and the same optical axis;

a rear optical unit disposed in such a manner that the superposed optical axes of said pair of front optical units coincide with an optical axis of said rear optical unit;

an image sensor for converting a light flux coming from said rear optical unit into an electrical signal; and a controller for automatically varying positions of an image taking-in area on said image sensor so that the varying is in synchronism with varying alternately the amounts of transmission of light fluxes respectively passing through said pair of front optical units such that the light fluxes respectively passing through said pair of front optical units strike the different positions, wherein those different positions overlap on the image taking-in area.

17. A stereoscopic image pickup optical system according to claim 16, wherein said shutter includes a pair of shutters arranged to respectively vary the amounts of transmission of light fluxes coming from the object alternately in a time-series manner, and said controller controls opening and closing of said pair of shutters.

18. A stereoscopic image pickup optical system according to claim 16, further comprising an iris disposed at a position where the respective optical axes of said pair of front optical units are superposed, or disposed in the vicinity of said position.

19. A stereoscopic image pickup optical system according to claim 16, wherein said rear optical unit includes a plurality of lens units arranged to move along an optical axis thereof for focusing or for variation of magnification.

20. A stereoscopic image pickup optical system according to claim 16, wherein an amount the positions of the image taking-in area are varied is determined based on the focal length of said stereoscopic image pickup optical system.

21. A stereoscopic image pickup optical system according to claim 20, wherein an amount the positions of the image taking-in area are varied is determined based on the object distance.

* * * * *

UNITED STATES PATENT AND TRADEMARK OFFICE
CERTIFICATE OF CORRECTION

PATENT NO. : 6,751,020 B2
DATED : June 15, 2004
INVENTOR(S) : Saburo Sugawara

It is certified that error appears in the above-identified patent and that said Letters Patent is hereby corrected as shown below:

Column 5,
Line 32, "the man," should read -- a human, --.

Column 7,
Line 28, "the man," should read -- a human, --.

Signed and Sealed this

Fourteenth Day of December, 2004

JON W. DUDAS
*Director of the United States Patent and Trademark Office*